J. W. McFERRAN.
PIPE COUPLING.
APPLICATION FILED FEB. 23, 1912.
1,186,812.
Patented June 13, 1916.
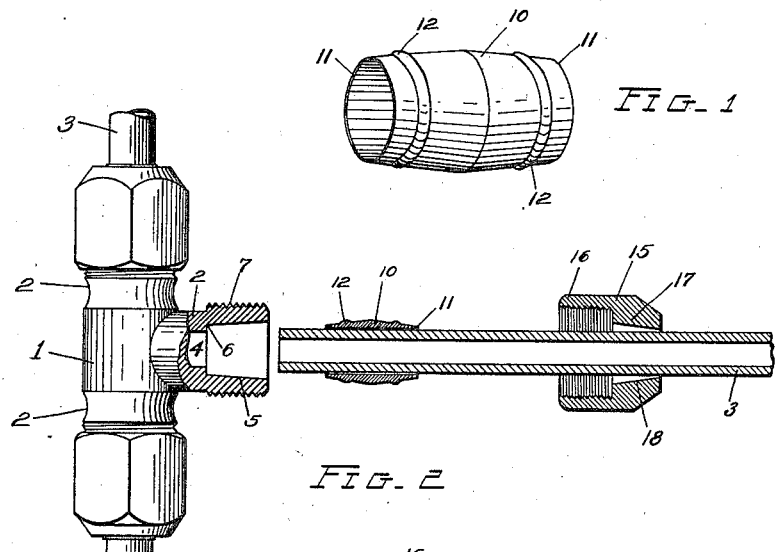
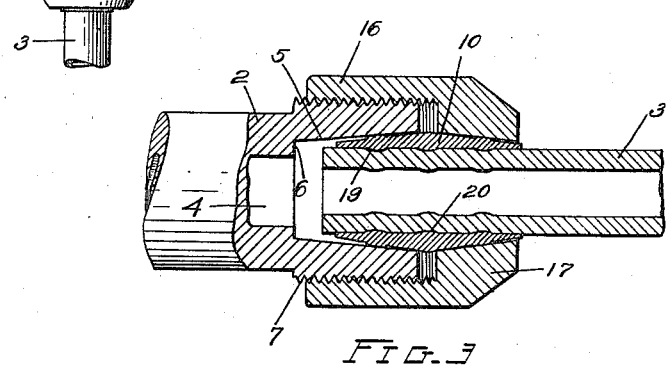
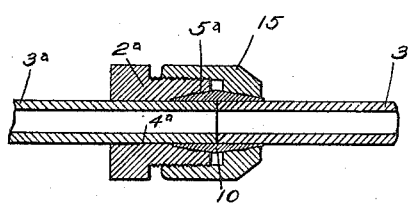
Witnesses:
Chas. Olbatt
Brennan B. West
Inventor,
John W. McFerran
By Hull & Smith
Attys.

UNITED STATES PATENT OFFICE.

JOHN W. McFERRAN, OF CLEVELAND, OHIO.

PIPE-COUPLING.

1,186,812.        Specification of Letters Patent.      Patented June 13, 1916.

Application filed February 23, 1912. Serial No. 679,393.

*To all whom it may concern:*

Be it known that I, JOHN W. McFERRAN, a citizen of the United States, residing at Cleveland, in the county of Cuyahoga and State of Ohio, have invented a certain new and useful Improvement in Pipe-Couplings, of which the following is a full, clear, and exact description, reference being had to the accompanying drawings.

This invention relates to pipe couplings, and has for its objects the provision of a device for connecting a soft metal pipe or rod to any desired fitting, or to connect two such sections of pipe or rod together without the use of solder or of soft packing, and by means of which such sections may be secured together, or to the fittings, with such permanence and rigidity as not to be dislodged therefrom by any amount of jarring or shaking, or by any pull or pressure less than sufficient to disrupt the section itself.

A second object of the invention is the provision of a device of this character which shall dispense with the necessity for threading, grooving, beading, expanding, flaring, flanging, or otherwise treating the ends of the section in any manner whatsoever, and in which the parts can be easily and conveniently put together without danger of their pulling apart or becoming disconnected during the process of connection, or requiring the employment of more than a single pair of hands for the purpose; while further objects and advantages of the invention will become apparent in the course of the following description and claims.

Generally speaking, my invention may be defined as consisting of the combination of parts and elements recited in the claims annexed hereto and illustrated in the drawings accompanying and forming a part hereof, although it will be understood that the embodiments illustrated in the drawings comprise but a very few of the great number of forms in which my invention can be embodied.

In these drawings, Figure 1 represents a perspective view of the sleeve or ferrule which forms an essential part of my improved coupling; Fig. 2 represents partly in elevation and partly in cross-section the parts of a pipe coupling embodied in my invention, the separate members being illustrated in disconnected position, the better to illustrate the method of assembling the same; Fig. 3 represents a cross-sectional longitudinal view through a completed joint, the same being drawn to a larger scale the better to illustrate the condition of the parts where the joint is completed; and Fig. 4 represents a similar cross sectional view illustrating a modified form of joint adapted to the connection of the adjacent ends of two soft metal pipes.

As is well known, the usual practice in automobiles, motor boats, aeroplanes, and other vehicles is to employ pipes of flexible soft metal such as lead or copper wherever conduits are necessary, as for the distribution of lubricant and the conveying of motive fluid, illuminating gas, and the like. The flexibility of these tubes permits them to be bent readily to fit the spaces provided therefor, while their softness tends to insure them against crystallization and breakage as a result of continued strain and vibration. The difficulty with these conduits has always occurred at the joints, since soldered joints were liable to break and pull away, threaded joints were prone to leak in addition to greatly weakening the tubing, while flanged, drawn, and other joints have never proved satisfactory. The joint which forms the subject of my invention comprises a thimble or sleeve adapted to be placed upon one or both of these soft metal tubes and to be constricted thereupon in such wise as to become firmly interlocked therewith and form a joint which shall be proof against leakage or breakage, and yet be readily dismounted upon occasion.

Specifically, this joint is designed as an improvement over that disclosed and claimed in the patent to Burgess, No. 906,099, dated December 8, 1908.

Describing the parts by reference characters, 1 represents the body of a pipe fitting to which it is desired to connect one or more tubes of the type described. In the present embodiment this fitting is illustrated as a T having nipples 2—2—2, to which are secured the flexible soft metal pipes 3—3—3. Each of the nipples of the fitting is provided with a central bore 4 opening into a conical recess 5, the bottom of the recess forming a shoulder 6 surrounding the bore, though this shoulder is not important to my invention. The exteriors of the nipples are provided with screw threads 7.

Upon the end of the pipe 3 is positioned a doubly tapering, exteriorly frusto-conical sleeve 10 of ductile metal, said sleeve having an axial bore of a diameter to receive snugly the pipe, and having a comparatively thin edge at each of its ends formed by the substantial convergence of the tapered exterior and the cylindrical bore. Surrounding each of the tapered exterior portions thereof at a short distance from the edge 11 is an annular rib 12, as shown in Figs. 1 and 2. The diameter of the sleeve at the rib 12 is intermediate the larger and smaller diameters of the recess 5. The other part of the coupling consists of a nut 15, comprising an interiorly threaded cylindrical portion 16 adapted to engage the threaded portion 7 of the nipple and an inwardly projecting flange 17 having its inner surface beveled or tapered as at 18 complementarily to that of the recess 5. The larger end of the portion 18 of the nut is preferably substantially equal in diameter to the adjacent end of the recess 5 and both may be made slightly smaller in diameter than the middle of the sleeve 10. When the parts are assembled, as shown in Fig. 2, the tube 3 introduced into the recess 5, the sleeve 10 advanced into the recess so that the rib 12 engages the surface thereof, and the nut 15 brought up and screwed upon the nipple 2, it will be seen that a powerful inward pressure will be brought to bear upon the ribs 12, causing them to be pressed down toward the conical surface of the sleeve. At the same time, the interior of the sleeve will be bulged inwardly, as at 19, so as to bite into the walls of the pipe as shown in Fig. 3, and this effect may even go so far as to form a slight rib in the interior of the pipe, this effect depending upon the thickness and softness of the pipe, the height of the rib 12, and the amount of the compression. At the same time, if the device has been designed as above described, the adjacent portions of the flange 17 and recess 5 will engage the middle portion of the sleeve so as to constrict that also, this action resulting in the formation of a second bead at 20. This feature of the device may obviously be dispensed with without invention and without materially weakening the joint.

The above-described modification is applicable in every case where it is desired to secure a pipe of soft metal to a fitting of hard metal. In case it be desired to secure together two soft metal pipes or rods, the modification illustrated in Fig. 4 is preferably employed. In this embodiment the pipes are indicated at 3 and 3ª, but instead of the nipple 2 a collar 2ª is employed, said collar having a portion 4ª closely surrounding the pipe 3ª and having its forward end recessed as at 5ª. The nut 15 is exactly the same as that above-described, as is also the sleeve 10, the beads 19 in this case being formed upon the ends of the different pipes rather than in the end of the same pipe.

It will be obvious from the foregoing that I have produced a joint in which the parts can be rapidly and conveniently joined together without the employment of heat or of special tools, in which there is no danger of slipping or shifting during the joining operation, and in which the possibility of leakage or breakage is at a minimum.

While I have necessarily described the invention in detail and particularly pointed out the construction which my experience indicates as preferable, I do not propose to be limited to such details or restricted to such construction except as the same may be positively included in the claims hereto annexed or may be rendered necessary by the prior state of the art.

It will also be understood that wherever in the claims I have employed the terms "soft metal" or "hard metal", I mean merely such degree of softness as shall permit the beading action of the members and not any such arbitrary degree of softness or hardness as would be implied by reference to a fixed scale.

Having thus described my invention, what I claim is:

1. In a coupling for cylindrical metal members, the combination, with a hard metal member having a flaring recess adapted to receive the coupled member, of a sleeve of strong ductile metal adapted to fit closely about said coupled member and having its outer surface tapered in the same direction as said recess, an integral annular rib surrounding said sleeve at a point adjacent to the smallest portion thereof, the diameter of said rib being intermediate the largest and smallest diameters of said recess, and means for forcing said sleeve into said recess, the angle of slope of said sleeve being greater than that of said recess whereby said sleeve may engage the interior of said recess both at the periphery of said rib and at a point spaced from said rib, whereby said sleeve is maintained with its axis parallel to said coupled member.

2. In a coupling for cylindrical ductile metal members, the combination with a hard metal member having at its end a flaring recess adapted to receive one of said coupled members, of a sleeve of strong ductile material adapted to fit closely about said coupled member and having its exterior tapered from its middle portion in both directions, an integral rib surrounding said sleeve adjacent to its forward end, said rib having a diameter intermediate the largest and smallest diameters of said recess, a second coupling member having a portion tapered to correspond substantially with the other tapered portion of said sleeve, and means whereby said coupling members may be drawn forcibly together whereby said ribs will be pressed down toward the exterior surface of said sleeve and the interior surface of said sleeve will be beaded so as to interlock with said coupled member, each of said coupling members being formed to engage a portion of said sleeve between said first ribs prior to the complete closing of the coupling.

3. In a coupling for cylindrical metal members, the combination with a hard metal member having at its end a flared recess adapted to receive one of said coupled members, of a sleeve of strong ductile material adapted to fit closely about said coupled member and having its exterior tapered from its middle portion in both directions, an integral rib surrounding said sleeve adjacent to each of its ends, a second coupling member having a portion flared to correspond substantially with the tapered portion of said sleeve, each of said ribs having a diameter intermediate the largest and smallest diameters of the flared portion to which it is adjacent, and means whereby said coupling members may be drawn forcibly together whereby one of said ribs will be pressed down toward the exterior surface of said sleeve by said nut and the other similarly pressed inwardly by said hard metal member and the interior surface of said sleeve will be beaded opposite each of said ribs so as to interlock with said coupled member, the middle portion of said sleeve being of greater diameter than the mouth of said recess, whereby the interaction of said recess and sleeve will form a bead upon the sleeve interior.

4. In a coupling for cylindrical compressible metal members, the combination with a hard metal coupling member having at its end a flaring recess adapted to receive one of said coupled members, of a sleeve of strong ductile material whose resistance to crushing is greater than the resistance of coupled members to compression, said sleeve being adapted to fit closely about said coupled members and having its exterior tapered from its middle portion in both directions, an integral rib surrounding said sleeve adjacent to each of its ends, a second coupling member having its interior tapered complementarily to said recess, and means for drawing said coupling members together with the larger ends of their tapered portions adjacent to each other, said ribs having an original diameter intermediate the largest and smallest diameters of said tapered portions.

5. In a coupling for two cylindrical metal members, the combination with a hard metal member having a cylindrical portion adapted to embrace one of said soft metal members and also having at its end a flaring recess adapted to receive the end of said member, of a sleeve of material whose resistance to crushing is greater than the resistance of said soft metal members to compression, said sleeve being adapted to receive closely the abutting ends of both coupled members and having its exterior tapered from its middle portion in both directions, an integral rib surrounding said sleeve adjacent to each of its ends, a second hard metal member having its interior tapered complementarily to said recess, and means for drawing said coupling members together with the larger ends of their tapered portions adjacent to each other, said ribs having an original diameter intermediate the largest and smallest diameters of said tapered portions.

6. In a coupling for soft metal members, the combination, with a fitting, of a sleeve adapted to surround and fit closely about such a member, and having an integral circumferential rib intermediate its ends, a coupling member adapted to surround said sleeve and rib, said coupling member being formed interiorly to engage said rib and a portion of the sleeve surface removed from said rib in advance of the rear of the sleeve surfaces, and means for drawing said coupling member toward said fitting and simultaneously constricting said rib, whereby said rib will be reduced exteriorly and the interior of said sleeve beaded to engage said soft metal member.

7. In a coupling, the combination with coupling members provided with openings to receive the member to be coupled, of a tapered sleeve of strong ductile material adapted to be placed over the members to be coupled between said coupling members and having an integral circumferential rib projecting from its tapered surface, one of said coupling members being provided with a tapered opening adapted to receive said rib, and means for drawing said coupling members together, whereby said ductile sleeve may be swaged inwardly to form a bead in said sleeve and a corresponding groove in said member to be coupled with which said bead will interlock, thus securing said coupled member against movement relative to the members of the coupling.

In testimony whereof, I hereunto affix my signature in the presence of two witnesses.

JOHN W. McFERRAN.

Witnesses:
 HAROLD S. SMITH,
 BRENNAN B. WEST.